(12) United States Patent
Lingemann

(10) Patent No.: US 11,814,111 B2
(45) Date of Patent: Nov. 14, 2023

(54) APPARATUS FOR PRESSING A RACK ONTO A PINION, AND STEERING SYSTEM FOR A MOTOR VEHICLE WITH AN APPARATUS OF THIS TYPE

(71) Applicant: ZF Automotive Germany GmbH, Alfdorf (DE)

(72) Inventor: Markus Lingemann, Bochum (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/868,142

(22) Filed: Jul. 19, 2022

(65) Prior Publication Data

US 2023/0023891 A1    Jan. 26, 2023

(30) Foreign Application Priority Data

Jul. 26, 2021  (DE) .......................... 102021208031.6

(51) Int. Cl.
  *B62D 3/12*  (2006.01)
  *F16H 19/04*  (2006.01)
  *F16H 55/28*  (2006.01)

(52) U.S. Cl.
  CPC ............. *B62D 3/123* (2013.01); *F16H 19/04* (2013.01); *F16H 2019/046* (2013.01)

(58) Field of Classification Search
  CPC ... B62D 3/123; F16H 19/04; F16H 2019/046; F16H 55/26; F16H 55/283; Y10T 74/19623; Y10T 74/19628; Y10T 74/1967
  See application file for complete search history.

(56) References Cited

U.S. PATENT DOCUMENTS

| 11,198,466 B2 * | 12/2021 | Feldpausch | B62D 3/123 |
| 2003/0074996 A1 * | 4/2003 | Camp | B62D 3/123 |
| | | | 74/409 |
| 2015/0166098 A1 * | 6/2015 | Lingemann | F16H 55/283 |
| | | | 74/409 |

FOREIGN PATENT DOCUMENTS

| CN | 203996407 U * | 12/2014 | ............. B62D 3/123 |
| DE | 102010029603 A1 | 12/2011 | |

(Continued)

OTHER PUBLICATIONS

Description Translation for DE 102012/100550 A1 from Espacenet (Year: 2012).*

*Primary Examiner* — Jason D Shanske
*Assistant Examiner* — Daniel M. Keck
(74) *Attorney, Agent, or Firm* — Kristin L. Murphy

(57) ABSTRACT

The disclosure relates to an apparatus for pressing a rack onto a pinion, with a pressure piece. The pressure piece being arranged within a housing and to be displaceable in an axial direction of a center longitudinal axis. A bearing element is fixed on the housing in the axial direction with respect to the center longitudinal axis. A prestressing element acts in the axial direction. The pressure piece is loaded by the prestressing element which is arranged between the pressure piece and the bearing element with a prestressing force in the axial direction with respect to the center longitudinal axis and directed away from the bearing element. An adjusting ring which is arranged between the bearing element and the pressure piece. At least two inclined faces of the adjusting ring and an adjusting section bear against one another. In order to be able to reduce the production outlay and/or realize a more compact overall design, a force application disk is arranged between the adjusting ring and the adjusting section.

20 Claims, 7 Drawing Sheets

(56) References Cited

FOREIGN PATENT DOCUMENTS

| DE | 102010039202 | A1 | * | 2/2012 | ............. | B62D 3/123 |
| DE | 102012100550 | A1 | * | 7/2013 | ............. | B62D 3/123 |
| DE | 102012013970 | A1 |   | 1/2014 | | |
| DE | 102018127166 | A1 | * | 5/2019 | ............. | B62D 3/123 |
| DE | 202020106930 | U1 | * | 1/2021 | ............. | B62D 3/123 |
| EP | 2684770      | A1 | * | 1/2014 | ............. | B62D 3/123 |

* cited by examiner

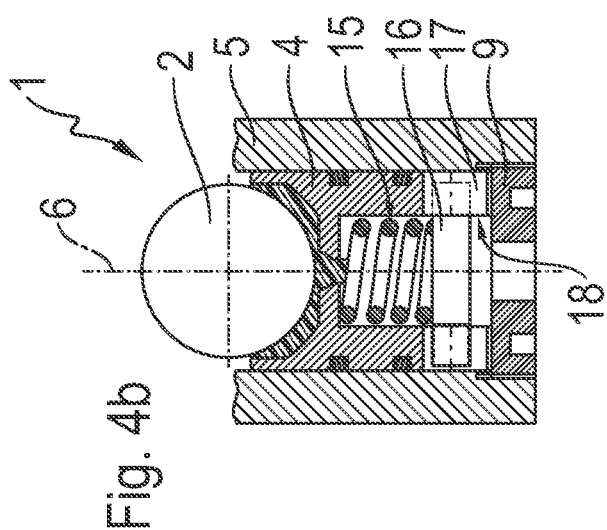
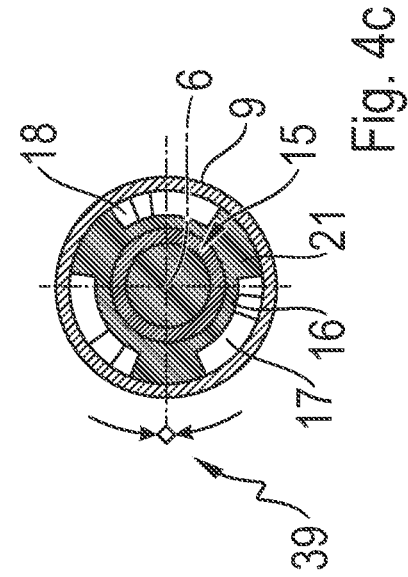
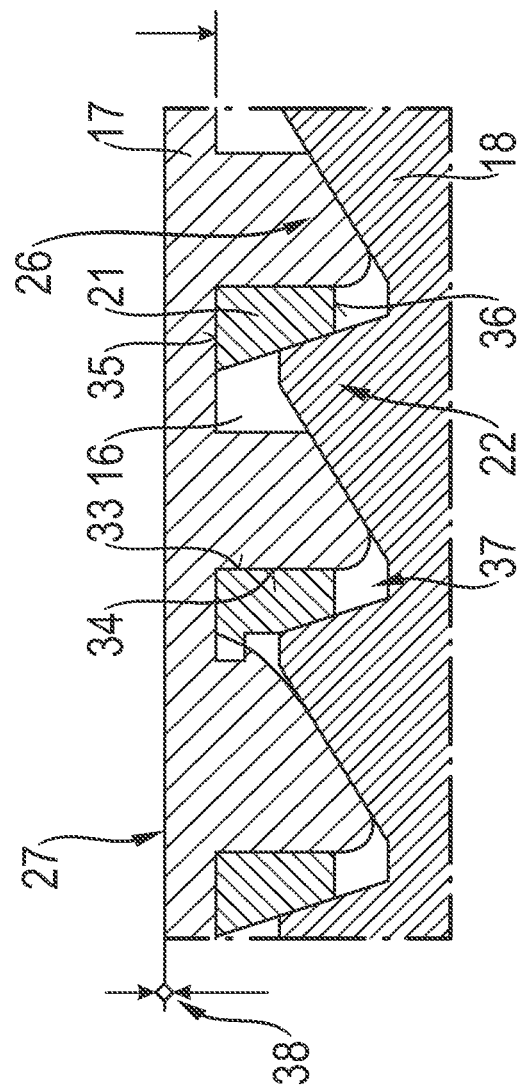
Fig. 4a
Fig. 4b
Fig. 4c

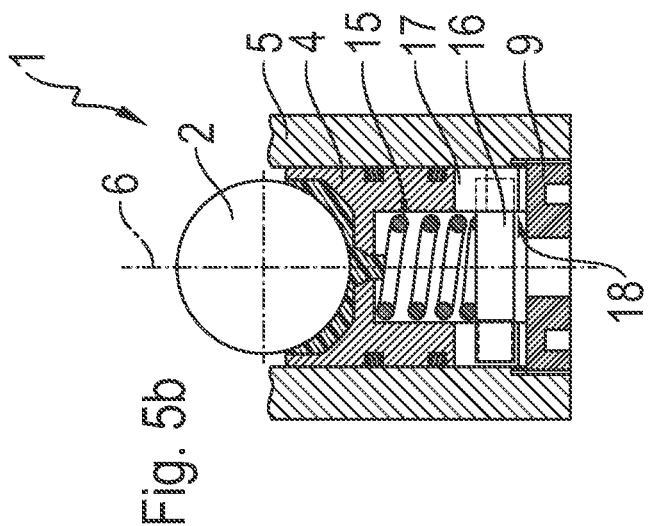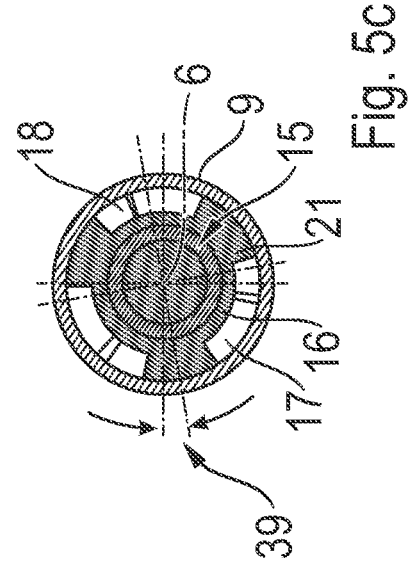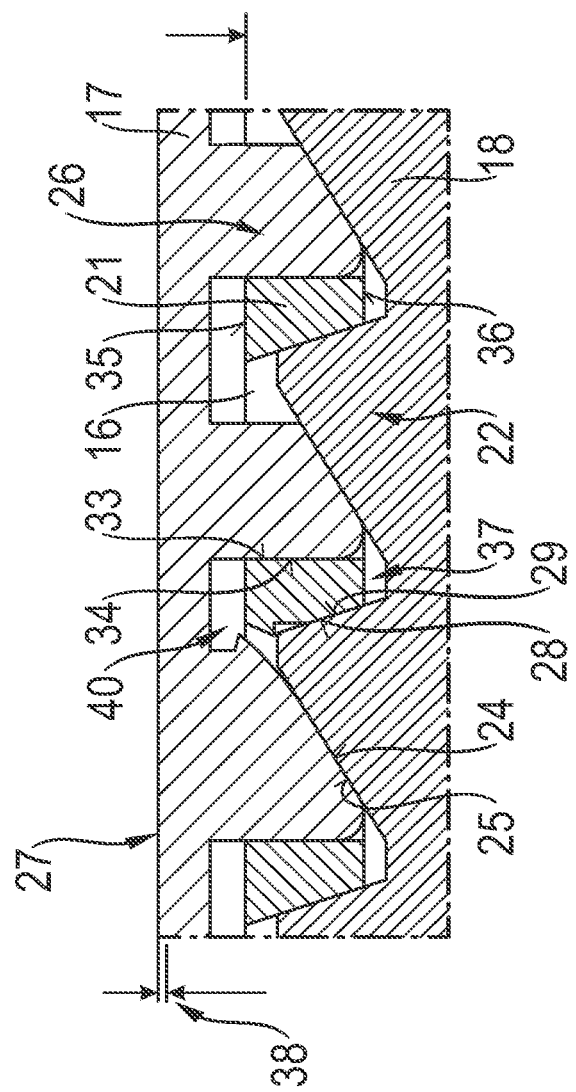
Fig. 5a
Fig. 5b
Fig. 5c

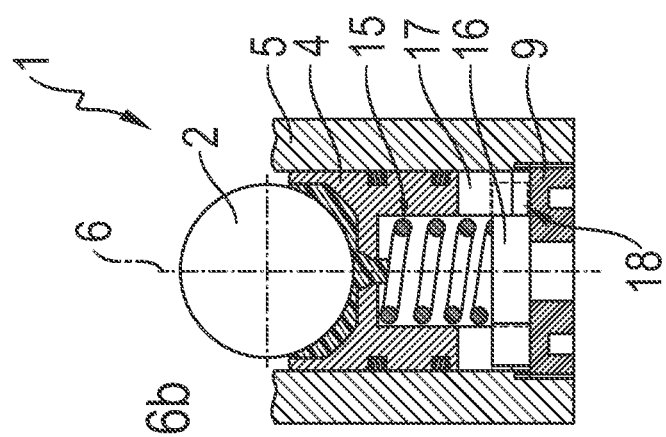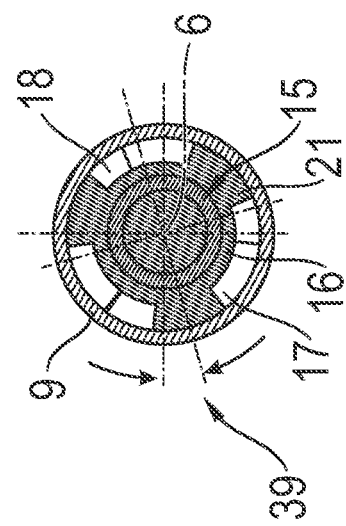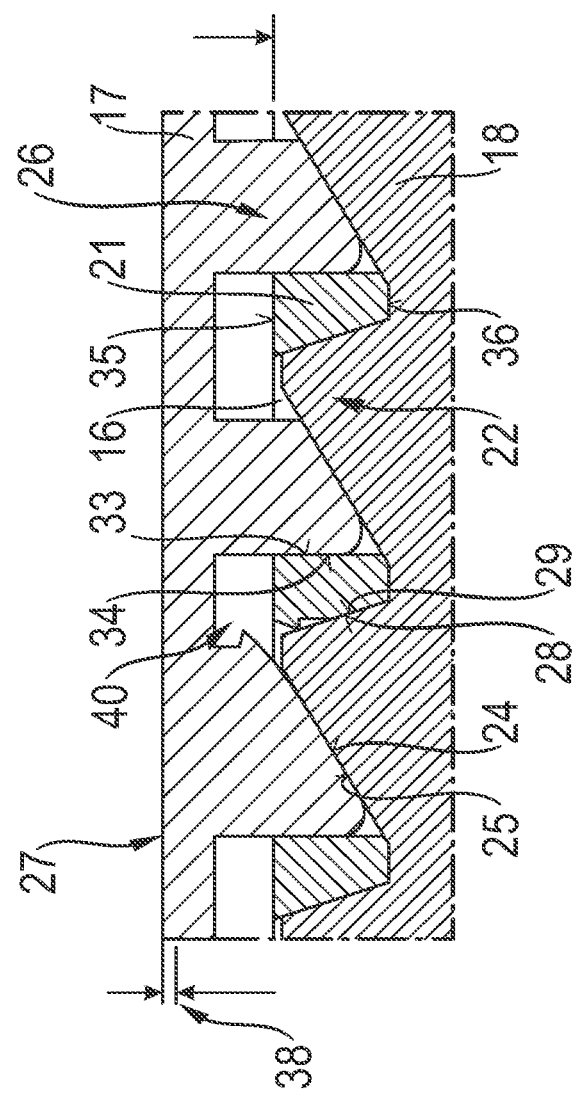

APPARATUS FOR PRESSING A RACK ONTO A PINION, AND STEERING SYSTEM FOR A MOTOR VEHICLE WITH AN APPARATUS OF THIS TYPE

CROSS-REFERENCE TO RELATED APPLICATION

This application claims priority to German Patent Application No. 102021208031.6, filed Jul. 26, 2021, the disclosure of which is incorporated herein by reference in its entirety.

TECHNICAL FIELD

The disclosure relates to an apparatus for pressing a rack onto a pinion, with a pressure piece, it being possible for the pressure piece to be arranged within a housing and to be displaceable in an axial direction of a center longitudinal axis, with a bearing element which can be fixed on the housing in the axial direction with respect to a center longitudinal axis, with a prestressing element which acts in the axial direction, the pressure piece being loaded by a prestressing element which is arranged between the pressure piece and a bearing element with a prestressing force in the axial direction with respect to the center longitudinal axis and directed away from the bearing element, and with an adjusting ring which is arranged between the bearing element and the pressure piece, at least two inclined faces of the adjusting ring and an adjusting section bearing against one another. Furthermore, the disclosure relates to a steering system for a motor vehicle, with a rack which is mounted displaceably in the longitudinal direction of the rack, and with a pinion, the rack engaging into the pinion, and with an apparatus of the type mentioned at the outset.

BACKGROUND

An apparatus of this type is known from DE 10 2010 029 603 A1. An apparatus of this type consists of a plurality of individual parts or elements which can be preassembled to form an assembly unit, for example, with the use of a spring pin. This assembly unit can subsequently be mounted in the housing. The housing can be configured as an independent element or as an integral or single-piece constituent part of a gear housing, for example of a steering gear housing. For tolerance compensation, in particular for compensation of play and/or wear, the known apparatus has two adjusting disks or adjusting rings which can be rotated relative to one another, a torsion spring and a spring washer as individual elements or components. The multiplicity of individual elements for configuring the apparatus can lead to an increased production and/or cost outlay.

SUMMARY

What is needed is to develop an apparatus of the type mentioned at the outset in such a way that the production outlay can be reduced and/or a more compact overall design can be realized. In particular, an alternative exemplary arrangement is provided.

The object which forms the basis of the invention is achieved by way of an apparatus as claimed in claim 1 and/or a steering system as claimed in claim 11. Preferred developments of the invention are found in the subclaims and in the following description.

Accordingly, the disclosure relates to an apparatus for pressing a rack onto a pinion. In one exemplary arrangement, the apparatus is configured for use in a steering gear and/or a steering system. The apparatus may be configured as a steering gear or a steering system. The steering gear and/or the steering system can be configured for use in a vehicle or can be arranged in a vehicle. In one exemplary arrangement, the apparatus and/or the steering gear and/or the steering system have/has the rack and the pinion. The pinion can be configured as a pinion gearwheel or as a pinion shaft, for example as a worm shaft. In exemplary arrangement, the pinion is in engagement with a gearwheel or worm gear which can be driven by a motor or electric motor.

The apparatus has a pressure piece, it being possible for the pressure piece to be arranged, or the pressure piece being arranged, within a housing and it being possible for it to be displaceable in an axial direction of a center longitudinal axis. In one exemplary arrangement, the apparatus has the housing. The housing has or forms a housing interior space. The housing interior space can be realized as a recess and/or bore. In one exemplary arrangement, the housing interior space is of hollow-cylindrical configuration. The pressure piece may be guided within the housing such that it can be displaced in the axial direction of the center longitudinal axis. The housing interior space and/or the pressure piece can have or define the center longitudinal axis. The center longitudinal axis of the housing interior space can coincide with the center longitudinal axis of the pressure piece. In one exemplary arrangement, the pressure piece is guided displaceably in the axial direction of the center longitudinal axis of the pressure piece.

The apparatus has a bearing element. The bearing element can be fixed or is fixed on the housing in the axial direction with respect to the center longitudinal axis. The bearing element can be configured as a covering and/or as a cover for the housing interior space and/or for closing the housing interior space. The bearing element can have a screw thread, for example an external thread, for screwing and/or fixing in an opening of the housing interior space. To this end, an opening and/or the housing interior space can have an internal thread of corresponding configuration to the external thread.

Furthermore, the apparatus has a prestressing element which acts in the axial direction. The prestressing element can be configured as a spring, for example, as a compression spring and/or helical spring. The prestressing element which is arranged between the bearing element and the pressure piece, loads the pressure piece with a prestressing force in the axial direction with respect to the center longitudinal axis, of the housing interior space and/or the pressure piece, and directed away from the bearing element. As a result, the rack can be pressed onto the pinion by the pressure piece.

In one exemplary arrangement, the apparatus has a sliding element. Here, the sliding element is arranged on a side, facing away from the prestressing element, of the pressure piece for bearing against the rack. During operation, the rack can be displaced by the pinion in a longitudinal direction of the rack in order to steer wheels. Here, the rack slides along the sliding element and is at the same time pressed onto the pinion. In one exemplary arrangement, the sliding element has a circular arc section-like or substantially circular arc section-like cross section. This cross section is configured for bearing against the rack. As an alternative, a sliding element which is configured in this way can be used, with the result that the sliding element realizes merely linear contact with the rack.

The apparatus has an adjusting ring which is arranged between the bearing element and the pressure piece. Here, at least two inclined faces of the adjusting ring and an adjusting section bear against one another. In other words, an inclined face of the adjusting ring therefore bears against an inclined face of the adjusting section. The adjusting ring and the adjusting section can in each case have a plurality of inclined faces, in each case one inclined face of the adjusting ring bearing against an inclined face of the adjusting section. The inclined face of the adjusting ring can be formed by a web section of the adjusting ring. In one exemplary arrangement, the adjusting ring has a plurality of, and in one exemplary arrangement, three, web sections which interact with wedge sections of the adjusting section and projections of the force application disk.

In one particular exemplary arrangement, an adjusting function can be realized by the adjusting ring and the adjusting section. Wear which occurs during operation and/or tolerances can be compensated for on the basis of the adjusting function. In one exemplary arrangement, the occurrence of undesired play in the apparatus can be reduced or avoided. A freedom from play or a predetermined tolerance specification can be maintained over a predetermined operating duration on the basis of the adjusting function.

A force application disk is arranged between the adjusting ring and the adjusting section. In one exemplary arrangement, the adjusting function can be realized on the basis of the interaction of the adjusting ring, the adjusting section and the force application disk. The force application disk may be configured as a rigid and/or inelastic body. A center longitudinal axis of the force application disk can coincide with a center longitudinal axis of the apparatus, the pressure piece and/or the housing interior space.

It is advantageous that fewer individual parts are necessary for producing the apparatus in comparison with the prior art on account of the combination of the adjusting ring, adjusting section and force application disk. For example, the production outlay can be reduced and/or more compact overall designs can be realized.

In accordance with one exemplary development, the force application disk bears partially against the adjusting ring and partially against the adjusting section. In this way, the force application disk can interact both with the adjusting ring and with the adjusting section. In one exemplary arrangement, at least two wedge faces of the force application disk and the adjusting section bear against one another. In other words, a wedge face of the force application disk therefore bears against a wedge face of the adjusting section. The force application disk and the adjusting section can in each case have a plurality of wedge faces. Here, a wedge face of the force application disk bears in each case against a wedge face of the adjusting section. In one exemplary arrangement, the wedge faces are oriented obliquely with respect to the center longitudinal axis.

Furthermore, two axial faces of the force application disk and the adjusting ring can bear against one another. In other words, an axial face of the force application disk bears against an axial face of the adjusting ring. The force application disk and the adjusting ring can in each case have a plurality of axial faces. Here, in each case one axial face of the force application disk bears against in each case one axial face of the adjusting ring. In one exemplary arrangement, the axial faces are oriented in the axial direction with respect to the center longitudinal axis and/or parallel to the center longitudinal axis. As an alternative, the axial faces can be oriented and/or configured obliquely with respect to the center longitudinal axis. Here, an acute angle, for example in the range between 0° and 10°, can be configured between the axial faces and the center longitudinal axis.

The wedge face and the axial face of the force application disk can be configured on two sides, facing away from one another, of a projection of the force application disk. The force application disk can have a plurality of projections which in each case have and/or form a wedge face and an axial face.

In accordance with a further exemplary arrangement, the prestressing element is supported with a first end directly on the force application disk. For example, the prestressing element is supported with a second end which faces away from the first end directly on the pressure piece. The prestressing element can be configured as a spring or compression spring. Therefore, as viewed in the longitudinal direction of the center longitudinal axis, the prestressing element can bear on one side against the force application disk and on the other side against the pressure piece. The prestressing element acts with a prestressing force in the axial direction with respect to the center longitudinal axis both on the pressure piece and on the force application disk.

In accordance with one exemplary arrangement, the adjusting ring and the force application disk can be rotated about the center longitudinal axis in order to realize an adjusting function. Here, the rotational capability or rotatability of the adjusting ring and the force application disk can be limited to a predetermined rotary angle range. For example, the adjusting ring and the force application disk can be rotated about the center longitudinal axis in the same rotational direction in order to realize the adjusting function. The adjusting ring and the force application disk can be rotated jointly in the same rotational direction in order to realize the adjusting function. Therefore, a joint and/or simultaneous movement of the adjusting ring and the force application disk always occurs in the case of adjustment.

In accordance with a further exemplary arrangement, the adjusting ring can be displaced and/or moved in the axial direction of the center longitudinal axis in order to realize the adjusting function. For example, the force application disk can be displaced and/or moved in the axial direction of the center longitudinal axis in order to realize the adjusting function. The force application disk can both be displaced in the axial direction of the center longitudinal axis and rotated about the center longitudinal axis in order to realize the adjusting function. The axial displacement of the force application disk can result in relation to the adjusting ring and/or to the adjusting section. The adjusting ring and the force application disk can be displaced and/or moved in two axial directions which face away from one another. Here, the adjusting ring can be displaced or moved in a direction away from the bearing element. The force application disk can be displaced and/or moved in the direction of the bearing element and/or away from the adjusting ring.

In accordance with one exemplary arrangement, at least one first radial face of the force application disk bears against the adjusting ring in a starting state. For example, at least one second radial face, which is arranged so as to face away from the first radial face, of the force application disk bears against the adjusting section in an end state. The first radial face and/or the second radial face extend/extends radially and/or at a right angle with respect to the center longitudinal axis. In one exemplary arrangement, a maximum adjusting travel is predetermined in the axial direction of the center longitudinal axis by the starting state and the end state. The first radial face is spaced apart from the force application disk and the second radial face is spaced apart from the adjusting section in an intermediate state between the starting state and the end state.

In one exemplary arrangement, the adjusting ring bears with a side which faces away from the adjusting section against the pressure piece. For example, the adjusting ring and the pressure piece are loaded by the force application disk with a force in the direction away from the bearing element. To this end, the force application disk can introduce and/or deflect, into the adjusting ring, the prestressing force which is introduced by the prestressing element and on account of the interaction with the adjusting section and the adjusting ring.

In accordance with a further exemplary arrangement, the adjusting section is fixed in the axial direction with respect to the center longitudinal axis. For example, the adjusting section is fastened to the housing and/or is configured on the latter. In particular, the adjusting section is configured as a constituent part of the bearing element. In other words, the adjusting section is therefore realized in one piece with the bearing element in the case of this exemplary arrangement. The adjusting section can have a plurality of wedge sections. Here, a wedge section can in each case have an inclined face and a wedge face.

In accordance with a further exemplary arrangement, the force application disk has a plurality of radial projections for interacting with the adjusting ring and the adjusting section. In particular, the radial projections in each case have a wedge face, an axial face, a first radial face and/or a second radial face. For example, the force application disk has three radial projections which interact with three wedge sections of the adjusting section.

A self-locking action and/or an overload safeguard of the apparatus can be realized or is predetermined by a predetermined angle of the inclined faces and/or the wedge faces in relation to the center longitudinal axis. A self-locking action of the apparatus is to be understood to mean that after a movement of the pressure piece in order to realize an adjusting function away from the bearing element and on account of a rotation of the adjusting ring and the force application disks, a subsequent opposite movement of the pressure piece in the direction towards the bearing element is prevented or blocked. An overload safeguard of the apparatus is to be understood to mean that, after a movement of the pressure piece in order to realize an adjusting function away from the bearing element and on account of a rotation of the adjusting ring and the force application disk, a subsequent opposite movement of the pressure piece in the direction toward the bearing element is made possible or permitted. In the case of a suitable configuration of the inclined faces and/or wedge faces, rotating back of the adjusting ring and the force application disk can therefore be permitted in order to realize the overload safeguard. In one exemplary arrangement, the function of the overload safeguard is available above a predetermined load input via the rack into the pressure piece. The load input which is predetermined for the overload safeguard can be predetermined for loads of the apparatus which lie above the loads of the apparatus in a normal or customary range. As a result, load peaks can be absorbed and/or damage of the apparatus or a steering system with an apparatus of this type can be avoided.

In accordance with a further exemplary arrangement, the force application disk is held for mounting purposes by a releasable positively locking connection in a starting state on the adjusting ring. The releasable positively locking connection can be realized by a snap-action connection and/or latching connection. To this end, the force application disk and the adjusting ring can have snap-action lugs or latching lugs which are of corresponding configuration to one another.

For mounting or during mounting of the apparatus, the force application disk can be supported in the axial direction of the center longitudinal axis by a counter-holder tool on a side which faces away from the prestressing element. This ensures that the force application disk is arranged in the starting state in relation to the adjusting ring during mounting and immediately after mounting.

A steering system for a motor vehicle is particularly advantageous, with a rack which is mounted displaceably in the longitudinal direction of the rack, and with a pinion, the rack engaging into the pinion, and with an apparatus according to the disclosure. The steering system can be developed in accordance with the refinements which are explained in conjunction with the apparatus according to the disclosure.

BRIEF DESCRIPTION OF DRAWINGS

In the following text, the disclosure will be explained in greater detail on the basis of the figures. Here, identical designations relate to identical, similar or functionally identical components or elements. In the figures:

FIG. 4a shows the side view of the unrolled circumference of the adjusting ring, the force application disk and the adjusting section in accordance with FIG. 3 in a starting state, FIG. 4b shows a sectioned side view of the apparatus according to the disclosure in the starting state, FIG. 4c shows a cross section of the adjusting ring, the force application disk and the adjusting section in the starting state, FIG. 5a shows the side view of the unrolled circumference of the adjusting ring, the force application disk and the adjusting section in an intermediate state, FIG. 5b shows a sectioned side view of the apparatus according to the disclosure in the intermediate state, FIG. 5c shows a cross section of the adjusting ring, the force application disk and the adjusting section in the intermediate state, FIG. 6a shows the side view of the unrolled circumference of the adjusting ring, the force application disk and the adjusting section in an end state, FIG. 6b shows a sectioned side view of the apparatus according to the disclosure in the end state, FIG. 6c shows a cross section of the adjusting ring, the force application disk and the adjusting section in the end state.

DETAILED DESCRIPTION

Figure 1:
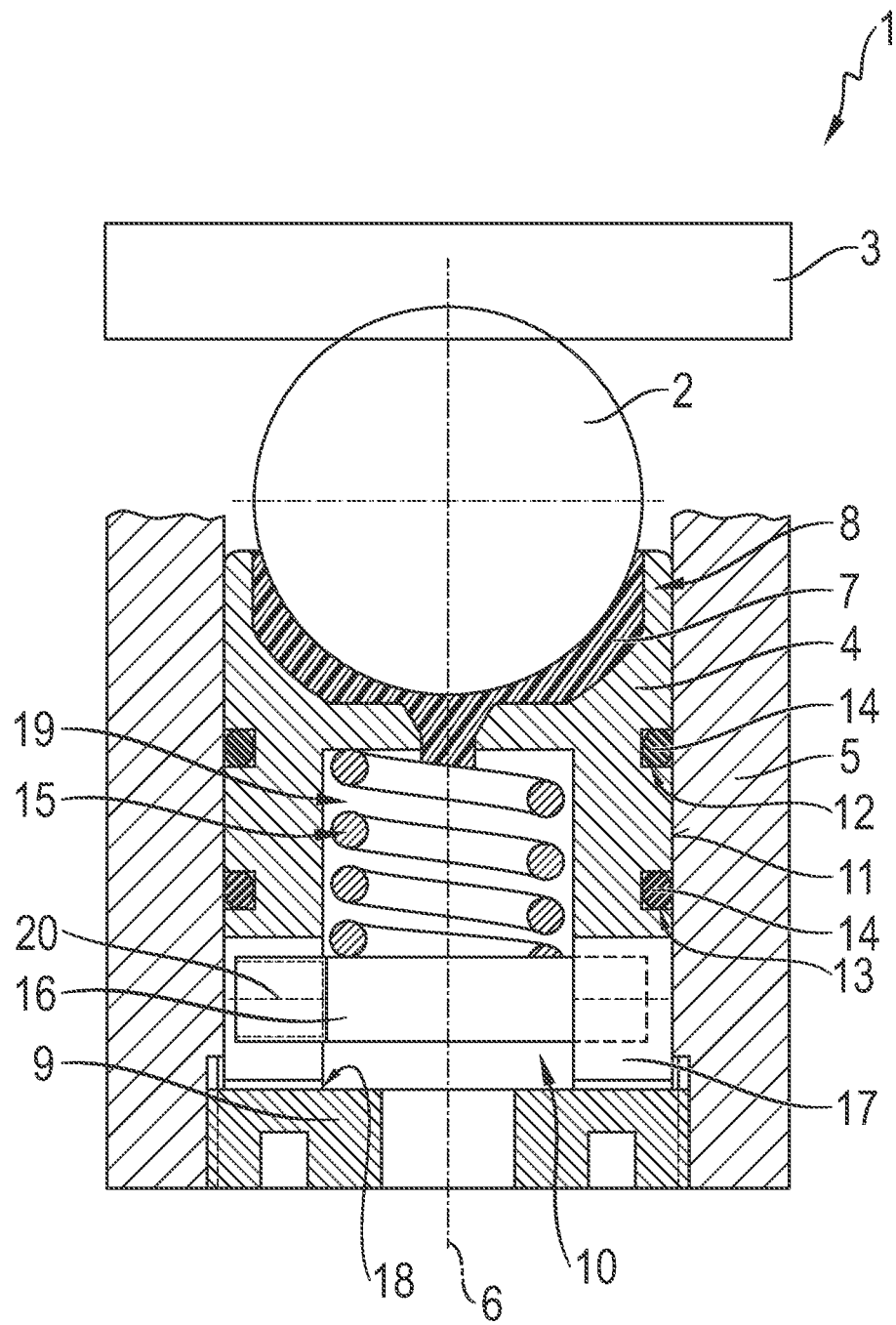
FIG. 1 shows a sectioned side view of an apparatus according to the disclosure.

FIG. 1 shows a sectioned side view of an apparatus 1 according to the disclosure. The apparatus 1 is configured for pressing a rack 2 onto a pinion 3 which is shown merely diagrammatically here. In the case of this exemplary arrangement, the apparatus 1 is realized as a constituent part of a steering system for a motor vehicle.

The apparatus 1 has a pressure piece 4. The pressure piece 4 is mounted within a housing 5 such that it can be displaced in an axial direction of a center longitudinal axis 6. In the case of this exemplary arrangement, a sliding element 7 is arranged between the pressure piece 4 and the rack 2. During operation, the rack 2 can be displaced by the pinion 3 in a longitudinal direction of the rack 2 in order to steer wheels (not shown here in greater detail). Here, the rack 2 slides along the sliding element 7 and is at the same time pressed onto the pinion 3 by the pressure piece 4. Here, the sliding element 7 is held on the pressure piece 4. In the case of this exemplary arrangement, the sliding element 7 has a circular arc section-like cross section which makes partial enclosure or bearing against the rack 2 possible. The sliding element 7 is arranged in a recess 8, configured in a corresponding manner to it, of the pressure piece 4.

The apparatus 1 has a bearing element 9 which is fixed on the housing 5 in the axial direction with respect to the center longitudinal axis 6. The bearing element 9 is arranged on the housing 5 on a side which faces away from the rack 2. In this exemplary arrangement, the bearing element 9 is configured as a type of cover which closes a housing interior space 10 of the housing 5. The housing interior space 10 is of hollow-cylindrical configuration in this exemplary arrangement. In a manner which corresponds to this, the pressure piece 4 has a cylindrical outer face 11. In this exemplary arrangement, the two circumferential grooves 12, 13 are configured in the outer face 11 of the pressure piece 4. In each case one seal 14 is arranged in the grooves 12, 13. In this exemplary arrangement, the seal 14 is realized in each case as an O-ring.

Furthermore, the apparatus 1 has a prestressing element 15 which acts in the axial direction with respect to the center longitudinal axis 6. The pressure piece 4 has a blind hole-like depression 19, in which the prestressing element 15 is arranged. In this exemplary arrangement, the prestressing element 15 is configured as a compression spring or helical spring. In the mounted state according to FIG. 1, the prestressing element 15 is arranged between the pressure piece 4 and the bearing element 9. Here, the pressure piece 4 is loaded by the prestressing element 15 with a prestressing force in a manner which is directed in the axial direction with respect to the center longitudinal axis 6 and away from the bearing element 9. Here, the prestressing element is supported with a first end directly on a force application disk 16 and is supported with a second end which faces away from the first end directly on the pressure piece 4. Here, the force application disk 16 is loaded by the prestressing element 15 with an axial prestressing force in the axial direction with respect to the center longitudinal axis 6 and in the direction of the bearing element 9.

An adjusting ring 17 is arranged, furthermore, between the bearing element 9 and the pressure piece 4. The adjusting ring 17 bears on one side directly against an adjusting section 18 and on the other side directly against the pressure piece 4. In this exemplary arrangement, the adjusting section 18 is configured as a single-piece constituent part of the bearing element 9. The force application disk 16 is arranged between the adjusting ring 17 and the adjusting section 18.

A dashed line 20 marks the position of the cross section which is shown in the following text in accordance with FIG. 2.

Figure 2:
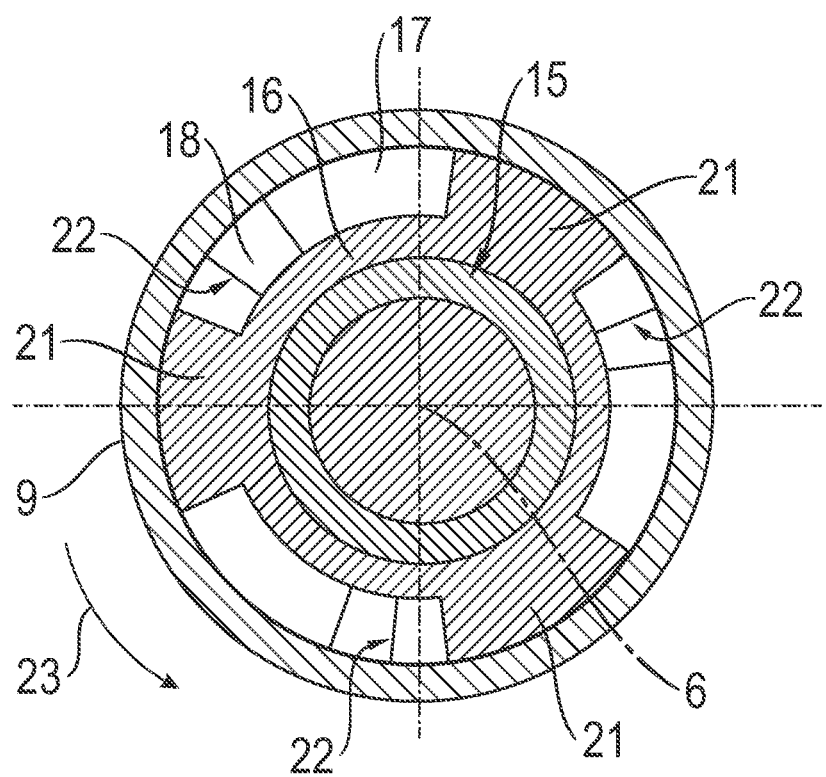
FIG. 2 shows a cross section of an adjusting ring, a force application disk and an adjusting section of the apparatus according to the disclosure in accordance with FIG. 1.

FIG. 2 shows a cross section of the adjusting ring 17, the force application disk 16 and the adjusting section 18 of the apparatus 1 according to the disclosure in accordance with the arrangement of FIG. 1 and the dashed line 20 which is shown there. The first end of the prestressing element 15 presses onto the force application disk 16. The force application disk 16 has a plurality of radial projections 21 for interacting with the adjusting ring 17 and the adjusting section 18. In this exemplary arrangement, the force application disk 16 has a total of three projections 21 which are arranged or configured homogeneously on the outer circumference of the force application disk 16.

The projections 21 interact in each case with a wedge section 22 of the adjusting section 18. In this exemplary arrangement, the adjusting section 18 therefore likewise has a total of three wedge sections 22. The adjusting ring 17 and the force application disk 16 can be rotated about the center longitudinal axis 6 in order to realize the adjusting function. The corresponding rotational direction is indicated here by the arrow 23. In this exemplary arrangement, the adjusting ring 17 and the force application disk 16 can be rotated about the center longitudinal axis 6 in the same rotational direction according to arrow 23, it being possible for the adjusting ring 17 and the force application disk 16 to be rotated jointly or at the same time in the same rotational direction in order to realize the adjusting function.

Figure 3:
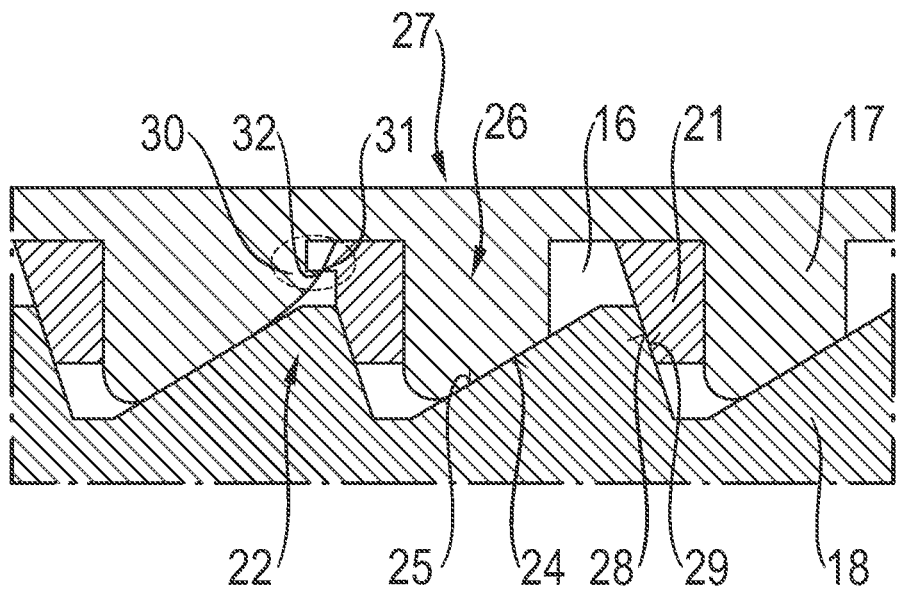
FIG. 3 shows a side view of an unrolled circumference of the adjusting ring, the force application disk and the adjusting section of the apparatus according to the disclosure in accordance with FIG. 1.

FIG. 3 shows a side view of an unrolled circumference of the adjusting ring 17, the force application disk 16 and the adjusting section 18 of the apparatus according to the disclosure in accordance with the arrangement of FIG. 1. An inclined face 24 of the adjusting ring 17 bears against an inclined face 25 of the adjusting section 18. Here, the inclined face 25 is configured as a constituent part of the wedge section 22. The inclined face 24 of the adjusting ring 17 is formed by a web section 26 of the adjusting ring 17. In this exemplary arrangement, the adjusting ring 17 has a total of three web sections 26 which interact with the wedge sections 22 and the projections 21.

The adjusting ring 17 has a side 27 which bears against the pressure piece 4 in the mounted state, see also FIG. 1 in this regard. The web sections 26 are configured on a side, facing away from the side 27, of the adjusting ring 17 and extend in the axial direction to the center longitudinal axis 6 (not shown in greater detail here).

The force application disk 16 bears partially against the adjusting ring 17 and partially against the adjusting section 18. To this end, the projection 21 of the force application disk 16 has a wedge face 28 which bears against a wedge face 29 of the adjusting section 18 or the wedge section 22.

A starting state is shown here, in which the force application disk 16 is held on the adjusting ring 17 by a releasable positively locking connection 30. In this exemplary arrangement, the positively locking connection 30 is configured as a snap-action or latching connection between one of the projections 21 and one of the web sections 26. To this end, one of the projections 21 has a first latching lug 31 which interacts in a positively locking manner with a corresponding second latching lug 32 of a web section 26.

FIG. 4a shows the side view of the unrolled circumference of the adjusting ring 17, the force application disk 16 and the adjusting section 18 according to FIG. 3 in the starting state. The projection 21 of the force application disk 16 in each case has an axial face 33. The axial face 33 of the force application disk 16 or the projection 21 bears in each case against an axial face 34 of the adjusting ring 17. In this exemplary arrangement, the axial faces 33, 34 extend in the longitudinal direction or parallel to the longitudinal direction of the center longitudinal axis 6 according to the arrangement of FIG. 1.

Moreover, the force application disk 16 or the projection 21 has a first radial face 35. The first radial face 35 extends radially or at a right angle with respect to the center longitudinal axis 6 according to FIG. 1. In the starting state which is shown here, the radial face 35 of the respective projection 21 bears against a correspondingly configured face of the adjusting ring 17.

Furthermore, the force application disk 16 or the projection 21 has a second radial face 36. The two radial faces 35, 36 are configured on two sides of the respective projection 21 which face away from one another. The second radial face 36 is also oriented radially or at a right angle with respect to the center longitudinal axis 6 according to FIG. 1. In the starting state which is shown here, the second radial face 36 is spaced apart from the adjusting section 18. This results in a clearance 37 between the second radial face 36 and the adjusting section 18.

It is indicated diagrammatically by an indicator 38 that, in the starting state which is shown here, no adjustment has taken place in the axial direction with respect to the center longitudinal axis 6 according to FIG. 1.

FIG. 4b shows a sectioned side view of the apparatus 1 according to the disclosure in the starting state. In the starting state, the force application disk 16 is arranged in the axial direction with respect to the center longitudinal axis 6 at the smallest possible spacing from the pressure piece 4 and at the greatest possible spacing from the bearing element 9.

FIG. 4c shows a cross section of the adjusting ring 17, the force application disk 16 and the adjusting section 18 in the starting state and as viewed in the axial direction with respect to the center longitudinal axis 6. It is indicated in accordance with an indicator 39 that, in the starting state, no rotation of the adjusting ring 17 and the force application disk 16 about the center longitudinal axis 6 and in relation to the adjusting section 18 has taken place.

FIG. 5a shows a side view of the unrolled circumference of the adjusting ring 17, the force application disk 16 and the adjusting section 18 in an intermediate state. In the intermediate state which is shown here, the apparatus 1 has realized an adjusting function, on the basis of which tolerances or wear which occurs are compensated for. During the transition out of the starting state according to FIGS. 4a to 4c into the intermediate state which is shown here, the positively locking connection 30 according to FIG. 4a is released or overcome. The force application disk 16 is moved in the axial direction of the center longitudinal axis 6 in the direction of the adjusting section 18. This movement is brought about by the prestressing element 15 which presses onto the force application disk 16. During the displacement of the force application disk 16 in the axial direction, the axial faces 33, 34 slide on one another. Furthermore, the projection 21 and its wedge face 28 slide along the wedge face 29 of the adjusting section 18. As a result, a rotational movement both of the force application disk 16 and of the adjusting ring 17 is brought about at the same time. As a result, the inclined face 24 of the respective web section 26 of the adjusting ring 17 in turn slides along the inclined face 25 of the adjusting section 18. As a result, a displacement or movement of the adjusting ring 17 is brought about in the axial direction of the center longitudinal axis 6 and in the direction of the pressure piece 4 (not shown in greater detail here).

On account of the movement of the force application disk 16 in the direction of the adjusting section 18, clearance 37 is reduced in size in comparison with the starting state according to FIG. 4a. At the same time, a further clearance 40 is formed between the first radial face 35 of the force application disk 16 and the adjusting ring 17.

FIG. 5b shows a sectioned side view of the apparatus according to the invention in the intermediate state. In comparison with FIG. 4b and the starting state which is shown there, it can be seen that, in the intermediate state which is shown here, the force application disk 16 is displaced or moved in the axial direction of the center longitudinal axis 6 away from the pressure piece 4 and in the direction of the adjusting section 18.

FIG. 5c shows a cross section of the adjusting ring 17, the force application disk 16 and the adjusting section 18 in the intermediate state and as viewed in the axial direction with respect to the center longitudinal axis 6. In comparison with FIG. 4c and the starting state which is shown there and with consideration of the indicator 39, it can be seen in the case of the intermediate state which is shown here that both the force application disk 16 and the adjusting ring 17 are rotated by a rotary angle about the center longitudinal axis 6.

FIG. 6a shows a side view of the unrolled circumference of the adjusting ring 17, the force application disk 16 and the adjusting section 18 in an end state. A maximum adjustment is reached in the end state. In the end state which is shown here, the force application disk 16 is displaced or moved in the direction of the adjusting section 18 until the second radial face 36 bears against the adjusting section 18, namely between two adjacent wedge sections 22 here. Accordingly, there is no longer a clearance 37, as can be seen in FIGS. 4a and 5a, in the end state.

In contrast, the spacing between the first radial face 35 and the adjusting ring 17 is at a maximum in the end state, and the clearance 40 has its maximum possible size. Starting from the intermediate state according to FIGS. 5a to 5c, the force application disk 16 is displaced further in the direction of the adjusting section 18 on account, for example, of progressing wear and by the prestressing element 15. Here, both the axial faces 33, 34 and the inclined faces 24, 25 slide on one another. Accordingly, in comparison with the intermediate state according to FIGS. 5a to 5c, the adjusting ring 17 is raised further from the adjusting section 18 or is moved in the direction of the pressure piece 4 by way of sliding of the inclined face 24 along the inclined face 25. As a result, the pressure piece 4 and therefore the rack 2 are pressed reliably onto the pinion 3 according to FIG. 1. In the end state which is shown here, a maximum adjusting travel, as indicated by way of the indicator 38, is realized.

FIG. 6b shows a sectioned side view of the apparatus 1 according to the disclosure in the end state. In comparison with the intermediate state according to FIG. 5b, the force application disk 16 is moved further in the direction of the bearing element 9 and away from the pressure piece 4 in the end state which is shown here. At the same time, the adjusting ring 17 is moved further in the opposite direction and in the direction of the rack 2, as a result of which the pressure piece 4 presses onto the rack 2.

FIG. 6c shows a cross section of the adjusting ring 17, the force application disk 16 and the adjusting section 18 in the end state and as viewed in the axial direction with respect to the center longitudinal axis 6. In comparison with the intermediate state according to FIG. 5c, the force application disk 16 and the adjusting ring 17 have been rotated even further about the center longitudinal axis 6. In the end state which is shown here, the indicator 39 illustrates the maximum possible rotary angle of the force application disk 16 and the adjusting ring 17 in relation to the adjusting section 18.

Figure 7A:
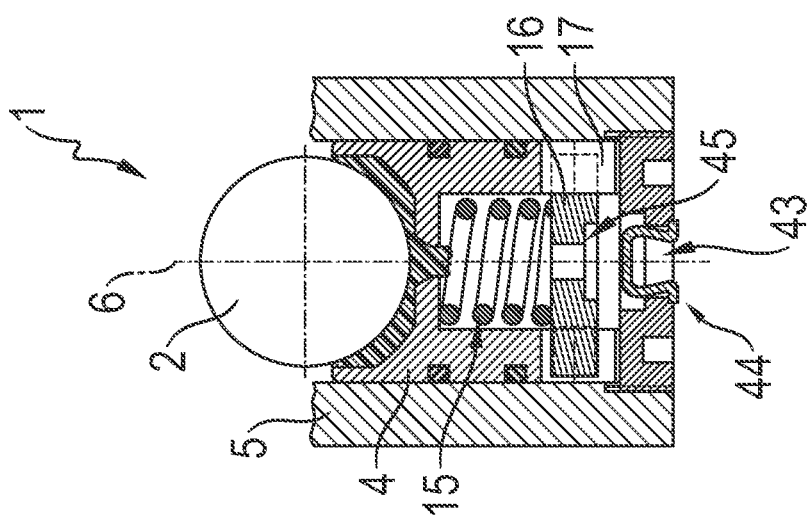
FIG. 7a shows a sectioned side view of the apparatus according to the disclosure in a partially mounted state and with a counterholder tool in a first assembly position.

FIG. 7a shows a sectioned side view of the apparatus 1 according to the disclosure in a partially mounted state and with a counterholder tool 41 in a first mounting position. In the case of this exemplary arrangement, the bearing element 9 together with the adjusting ring 17 and the force application disk 16 is mounted or screwed into the housing 5 by means of the counterholder tool 41. To this end, a pin section 42 of the counterholder tool 41 extends through an opening 43 of the bearing element 9 as far as the force application disk 16. Here, the pin section 42 holds the force application disk 16 in the starting state according to FIG. 4a. As a result, it is prevented during mounting that the force application disk 16 is released from the starting state and is prematurely pressed in the direction of the bearing element 9, for example on account of the action of the prestressing element 15.

Figure 7B:
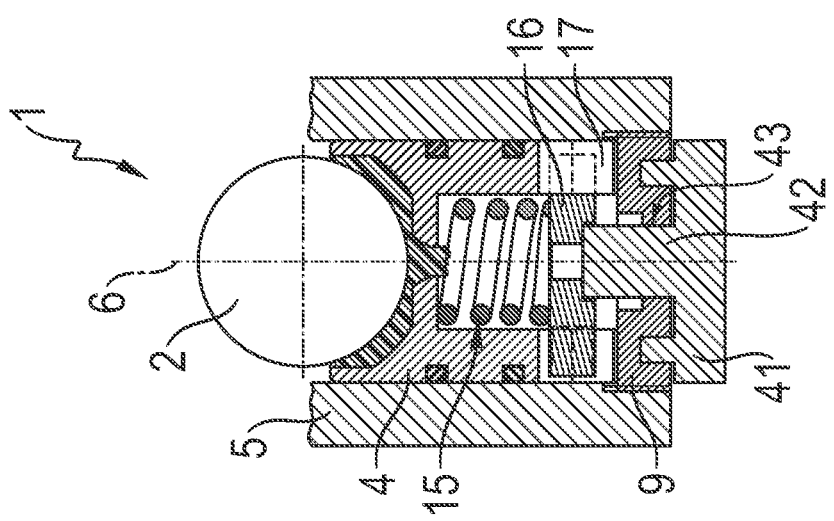
FIG. 7b shows a sectioned side view of the apparatus according to the disclosure in a partially mounted state and with the counterholder tool in a further assembly position.

FIG. 7b shows a sectioned side view of the apparatus 1 according to the disclosure in a partially mounted state and with the counterholder tool 41 in a further mounting position. In the further mounting position which is shown here, the bearing element 9, the adjusting ring 17 and the force application disk 16 have reached their final position, in which the adjusting ring 17 bears against the pressure piece 4. Subsequent to this, the counterholder tool 41 can be released from the apparatus 1.

Figure 7C:
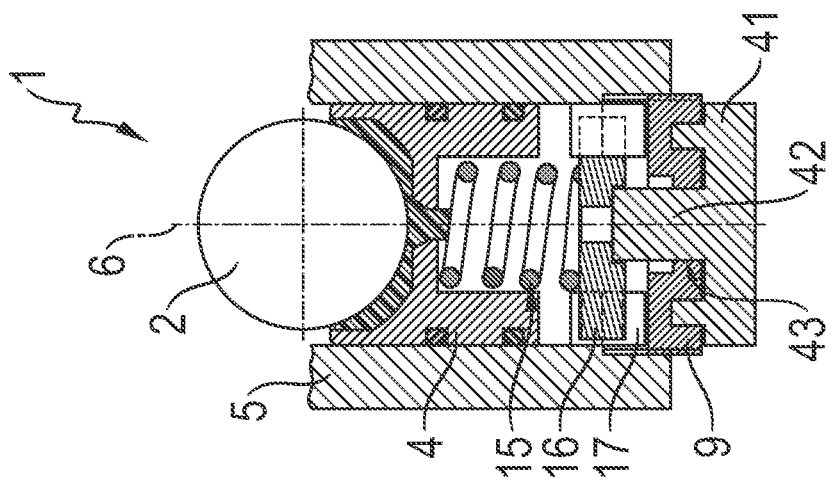
FIG. 7c shows a sectioned side view of the apparatus according to the disclosure in a fully mounted state.

FIG. 7c shows a sectioned side view of the apparatus 1 according to the disclosure in a fully mounted state. The counterholder tool 41 is removed. The opening 43 of the bearing element 9 is closed by a closure element 44 of suitable configuration. In this exemplary arrangement, the force application disk has a central through hole 45. As a result, and after the removal of the counterholder tool 41 and before the insertion of the closure element 44, a movability of the pressure piece 4 in the axial direction of the center longitudinal axis 6 can be tested. For example, a dial gauge (not shown here in greater detail) can be introduced through the through hole 45 and can be placed on the pressure piece 4 in order to measure a movement travel of the pressure piece 4 in the axial direction of the center longitudinal axis 6. Via this, an interlocking quality between the rack 2 and the pinion 3 (not shown in greater detail here) which interacts with the rack 2 can be extrapolated.

In the preceding figures, not all of the elements or components are shown with hatching, for example with regard to the adjusting ring 17 and/or the force application disk 16, in the sectioned side views or cross sections, in part for the benefit of improved clarity.

The invention claimed is:

1. An apparatus for pressing a rack onto a pinion, comprising a pressure piece wherein the pressure piece is arranged within a housing and is displaceable in an axial direction of a center longitudinal axis, a bearing element which is fixable on the housing in the axial direction with respect to the center longitudinal axis, a prestressing element which acts in the axial direction, wherein the pressure piece is loaded by the prestressing element which is arranged between the pressure piece and the bearing element with a prestressing force in the axial direction with respect to the center longitudinal axis and directed away from the bearing element, and an adjusting ring which is arranged between the bearing element and the pressure piece, at least two inclined faces of the adjusting ring and an adjusting section of the bearing element bearing against one another, wherein a force application disk is arranged between the adjusting ring and the adjusting section.

2. The apparatus as claimed in claim 1, wherein the force application disk bears partially against the adjusting ring and partially against the adjusting section.

3. The apparatus of claim 2, wherein at least two wedge faces of the force application disk and the adjusting section bear against one another, and at least two axial faces of the force application disk and the adjusting ring bear against one another.

4. The apparatus of claim 2, wherein the prestressing element is supported with a first end directly on the force application disk, and wherein the prestressing element is supported with a second end which faces away from the first end directly on the pressure piece, and wherein the prestressing element is configured as a spring.

5. The apparatus as claimed in claim 1, wherein the prestressing element is supported with a first end directly on the force application disk.

6. The apparatus of claim 5, wherein the prestressing element is supported with a second end which faces away from the first end directly on the pressure piece, and wherein the prestressing element is configured as a spring.

7. The apparatus as claimed in claim 5, wherein the adjusting ring and the force application disk are rotatable about the center longitudinal axis to realize an adjusting function, and the adjusting ring and the force application disk are rotatable in the same rotational direction in order to realize the adjusting function.

8. The apparatus as claimed in claim 1, wherein the adjusting ring and the force application disk is rotatable about the center longitudinal axis.

9. The apparatus of claim 8, wherein the adjusting ring and the force application disk are rotatable about the center longitudinal axis in the same rotational direction to realize the adjusting function, and the adjusting ring and the force application disk are rotatable jointly in the same rotational direction to realize the adjusting function.

10. The apparatus as claimed in claim 1, wherein the adjusting ring is displaceable in the axial direction of the center longitudinal axis to realize an adjusting function.

11. The apparatus as claimed in claim 10, wherein the force application disk can be displaced in the axial direction of the center longitudinal axis to realize the adjusting function, and the adjusting ring and the force application disk is displaceable in two axial directions which face away from one another.

12. The apparatus as claimed in claim 1, wherein at least one first radial face of the force application disk bears against the adjusting ring in a starting state.

13. The apparatus as claimed in claim 12, wherein at least one second radial face is arranged so as to face away from the first radial face and bears against the adjusting section in an end state, a maximum adjusting travel being predetermined in the axial direction of the center longitudinal axis by means of the starting state and an end state, and the first radial face being spaced apart from the adjusting ring and the second radial face being spaced apart from the adjusting section in an intermediate state between the starting state and the end state.

14. The apparatus as claimed in claim 1, wherein the adjusting ring bears with a side which faces away from the adjusting section against the pressure piece, and, wherein, the adjusting ring and the pressure piece are loaded by the force application disk with a force in a direction away from the bearing element.

15. The apparatus as claimed in claim 14, wherein the force application disk has a plurality of radial projections for interacting with the adjusting ring and the adjusting section, and, wherein, the projections in each case have a wedge face, an axial face, a first radial face and/or a second radial face.

16. The apparatus as claimed in claim 15, wherein the force application disk is held for mounting purposes by a releasable positively locking connection in a starting state on the adjusting ring, and, the force application disk is supported in the axial direction of the center longitudinal axis during the mounting by a counterholder tool on a side which faces away from the prestressing element.

17. The apparatus as claimed in claim 1, wherein the adjusting section is fixed in the axial direction with respect to the center longitudinal axis, and the adjusting section has a plurality of wedge sections, wherein each wedge section has an inclined face and a wedge face, and, wherein, the adjusting section is configured as a constituent part of the bearing element.

18. The apparatus as claimed in claim 1, wherein the force application disk has a plurality of radial projections for interacting with the adjusting ring and the adjusting section of the bearing element, and, wherein, the projections have a wedge face, an axial face, a first radial face and/or a second radial face.

19. The apparatus as claimed in claim 1, wherein the force application disk is held for mounting purposes by a releasable positively locking connection in a starting state on the adjusting ring, and, the force application disk is supported in the axial direction of the center longitudinal axis during the mounting by a counterholder tool on a side which faces away from the prestressing element.

20. A steering system for a motor vehicle, with a rack which is mounted displaceably in a longitudinal direction of the rack, and with a pinion, the rack engaging into the pinion, and with the apparatus as claimed in claim 1.

* * * * *